(12) United States Patent  (10) Patent No.: US 8,364,680 B2
Bilbrey  (45) Date of Patent: Jan. 29, 2013

(54) COMPUTER SYSTEMS AND METHODS FOR COLLECTING, ASSOCIATING, AND/OR RETRIEVING DATA

(75) Inventor: Brett Bilbrey, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 218 days.

(21) Appl. No.: 12/571,203

(22) Filed: Sep. 30, 2009

(65) Prior Publication Data

US 2011/0078151 A1  Mar. 31, 2011

(51) Int. Cl.
*G06F 7/00* (2006.01)
(52) U.S. Cl. ........................................ 707/737; 707/752
(58) Field of Classification Search .................. 707/705, 707/725, 746, 749, 758, 769, 737
See application file for complete search history.

(56) References Cited

U.S. PATENT DOCUMENTS

| | | | |
|---|---|---|---|
| 2008/0109881 A1* | 5/2008 | Dasdan | 726/4 |
| 2009/0222432 A1* | 9/2009 | Ratnakar | 707/5 |
| 2010/0029326 A1* | 2/2010 | Bergstrom et al. | 455/556.1 |
| 2010/0063961 A1* | 3/2010 | Guiheneuf et al. | 707/622 |
| 2010/0332495 A1* | 12/2010 | Richter et al. | 707/759 |

* cited by examiner

*Primary Examiner* — Amy Ng
(74) *Attorney, Agent, or Firm* — Fletcher Yoder PC

(57) ABSTRACT

Systems and methods may provide collection of data and association of searchable tags with the collected data. In an embodiment, a system may include at least one sensor configured to collect a primary data, and a processor configured to date and/or time stamp the primary data, to generate at least one searchable tag based on content of the primary data, and to associate the at least one searchable tag with the date and/or time-stamped primary data. Additionally, systems and methods may provide retrieval of primary data from a database based at least in part on tags that match at least part of a query. In an embodiment, the retrieved data may include at least one matching tag.

12 Claims, 10 Drawing Sheets

COMPUTER SYSTEMS AND METHODS FOR COLLECTING, ASSOCIATING, AND/OR RETRIEVING DATA

TECHNICAL FIELD

This invention relates generally to computer systems and methods, and more specifically to computer systems and methods involving data collection, association and/or retrieving data.

BACKGROUND

Computer systems, including personal computers, are obviously well known. Conventional computer systems include basics such as input devices (keyboard, mouse, trackball, stylus, touchscreen, and the like), storage devices (hard drive, disc drive, CD-ROM drive, and the like), one or more processors (CPU, dedicated microprocessor, and the like), a display (cathode ray tube (CRT), liquid crystal display (LCD), or the like), and other miscellaneous elements, both general and specific (memory, bus, video/graphics card, modem, and the like). In general, computers are capable of storing information or data from various input devices. However, the information collected by a computer from different input devices is typically unrelated and stored separately, other than audio and video data that may be simultaneously collected and stored together as a single audio-visual file.

One known system that is different from most computers is a computer system that includes a "smart pen" such as LIVESCRIBE™. The smart pen includes an infrared camera that captures everything that is written/drawn on a page of paper using the smart pen and a microphone that captures audio. The infrared camera and the microphone capture such visual and audio data while the smart pen is in a "record" mode, thereby associating the audio data with the video data captured at the same time. Once recording is stopped, audio that was recorded when a writing/audio writing/drawing was created may be played back by the smart pen by touching the paper at that writing/drawing with the smart pen.

The smart pen is capable of storing the recorded audio and visual data locally. Also, the smart pen is configured to transfer the data to a computer, such as a laptop or desktop computer, via a universal serial bus (USB) connection. The computer may stored the visual data as page images with the associated audio linked to the particular writings/drawings. Once transferred, the data may be searched for keywords. The keywords may be identified in the stored page images, for example, by highlighting. Selecting a highlighted keyword may cause the associated audio data to be played back.

SUMMARY

Various embodiments described herein are directed to computer systems and methods that provide audio and/or video data collection and processing of the collected data to assign tags to the collected data. The tags may include date and/or time stamps, object identification, person identification, voice identification, location identification, keyword identification, or the like. Also, various embodiments described herein are directed to computer systems and methods in which data is collected using a plurality of data inputs, at least part of the collected data is monitored for an occurrence of an event, the occurrence of the event is detected, a plurality of searchable tags are generated from the collected data when the occurrence of the event is detected, the plurality of generated tags are associated with the event, and the event and the generated tags are stored. Events may be of various nature including, but not limited to, emails, text messages, changing location (e.g., walking or driving), recognition of a person's face, recognition of a person's voice, and telephone calls, as well as any other human interaction that may be of interest.

Various sensors may be employed to collect audio data, video data, location data, movement data, or the like. Other data may include telephone calls, such as who places the call, what number is called, who is called, and the voices and words of the conversation, message, or the like. Also, other data may include computer usage, such as who is the user, what programs are used, what web sites are visited, what keystrokes are made, and what content is received, such as music, video, or the like. Also, other data may include photographs, such as who takes the picture, who is in the picture, where the picture is taken (location), what else is in the picture (environment, objects, and the like), or the like. Such data may be associated with each other via a date and/or time stamp. Further, such data may be processed to generate various tags that are associated with the collected audio and/or video data. For example, collected audio data may be processed to identify spoken keywords and/or to identify a speaker by voice recognition. Collected video and/or photograph data may be processed to identify people, objects, locations, written or typed keywords, or the like. Tags corresponding to the identified information may be generated and stored and/or linked with the audio and/or video data. Alternatively or additionally, a user may apply such tags, as appropriate or desired. Further, in addition to the data collection described above, a user may manually add data, by voice or otherwise, to create reminders or "to do" items. The manually added data may have various tags generated based on the content of the data. For example, a reminder to ask a certain person regarding a certain thing may cause tags, such as the certain person and the certain something, to be generated. Such generated tags may create a search for the generated tags in data as data is collected, and the reminder may be output to the user upon a match of one or more of the generated tags. Such a search may be made with or without user input. For example, the search may be automatically performed, such as periodically, to identify matches in data as the data is collected and thus provide the reminder to the user at an appropriate moment, such as when the data collected includes a tag corresponding to the certain person or the certain something. Another example is a "to do" such as "get milk." The user input of such a reminder may generate a tag for the item "milk" and a tag for the action "get" (e.g., buy, purchase, shop, or the like). When the data collected includes a matching tag, such as a store that sells the item "milk," the reminder may be provided to the user. As described above, each of the data collected may be identified as an occurrence of an event, resulting in generation of a plurality of tags based on data collected when the event occurs, and storage of the event and the generated tags associated with the event.

In various embodiments, collection of video data may be implemented using a camera and audio data may be implemented using a microphone. As described herein, the audio and/or video data collected may be considered primary data. In other words, the audio and/or video data collected may be the primary source of data to be collected and analyzed, with the primary data being tagged based on information contained in the primary data. It should be understood that an occurrence of an event in any of the data collected may be considered to be the primary data. Thus, the primary data may be any of the data collected by multiple data inputs. Once the occurrence of the event is detected or identified, a plurality of searchable tags may be generated based on the primary data and other secondary data collected. The generated tags may be associated with the event and stored with the event as a searchable database.

Collection of secondary data, other than the primary data, may be implemented using other suitable sensors. For example, location data may be collected using a global positioning satellite device, movement or motion data may be collected by an accelerometer, and so forth. Photograph data may be collected by the camera as part of the process of taking a picture or video, for example, using the image sensor and the microphone of the camera, as well as an auxiliary image sensor to capture the picture taker. Computer usage data may be collected by the components of the computer itself using suitable software. Other user input such as for reminders may be collected by any suitable input device or devices, including but not limited to a microphone, a keyboard, a mouse, a trackball, a touch pad or screen, or the like. As described herein, such secondary data may be a secondary source of data to be collected and analyzed, either separately or in conjunction with the primary data, with the primary data being tagged based on information contained in the secondary data. In other words, an occurrence of an event in the primary data may be detected or identified, and a plurality of searchable tags may be generated based on the primary and/or secondary data, associated with each other, and stored in a searchable database.

Various embodiments contemplate date and/or time stamping primary data, such as audio data and/or video data. The primary data and other collected data may be processed or analyzed to identify information that may be of particular interest. A tag may be generated for each identified information and may be associated with the primary data at the corresponding date and/or time stamp in the primary data. The identified information of particular interest may be considered to be an occurrence of an event. Thus, a plurality of searchable tags may be generated based on the collected data, associated with each other, and stored in a searchable database.

Various embodiments contemplate the generated tags to be searchable so that primary data and any associated secondary data may be retrieved. For example, primary data and associated tags may be stored in a database. Secondary data and the corresponding tags associated with the primary data may also be stored in the database. The database may be searched for one or more tags based upon a query. Each query may include one or more keywords, one or more names of people, animals or objects, one or more tag types, a location or place, or the like. Tags that match the query may be retrieved from the database and presented to a user in a suitable manner. In particular, the database may include primary and/or secondary data that is input and/or collected by a plurality of persons. As such, one of the tags associated with the primary and/or secondary tags may be the identity of the particular person who input or otherwise collected the primary and/or secondary data.

In some embodiments, at least one of the retrieved tags may be user-selectable to retrieve primary data and/or secondary data associated with the respective tag(s). Further, by presenting retrieved tags to a user as a search result, the user may easily determine relevance of the search result, relevance of a particular received tag, and relevance of primary and/or secondary data associated with each retrieved tag.

In some embodiments, the database may be accessible only to a particular user, such as the user to whom the device or devices that collect the primary and/or secondary data belong. This may be achieved in any suitable manner, such as requiring user identification for access (e.g., user name or ID, user password, biometrics (e.g., fingerprint scanner, retina scanner, voice and/or face recognition)) and/or use of a particular device that is operable by a particular user only when an "unlocking" code known only to the user or other user-identification is supplied. It should be understood that access may be granted to a specified group of users in a similar manner, or alternatively access may be available to all potential users.

In some embodiments, results of a query may be presented as a replay or audio and/or video data for which one or more tags match the query, such as audio and/or video data having the most matching tags associated therewith. Alternatively or additionally, the results of a query may be presented as one or more user-selectable results, for example, listing the audio and/or video data in order of the number of matching associated tags. Selecting one of the audio and/or video data listed may cause the audio and/or video to be played back.

Additionally or alternatively, the results of a query may be presented as a date and/or time line with a plurality of audio and/or video data associated with the corresponding points along the time line. Each of the plurality may be selectable to cause playback of the particular audio and/or video. Further, the results may presented with one or more of the matching tags associated with the corresponding points along the time line. Selection of one of the tags may cause information associated with that tag to be provided as output. The associated information may be one or more other tags associated with the particular date and/or time stamp and/or overlapping with the selected tag. Alternatively or additionally, the associated information may be associated only with the tag. For example, if the selected tag is a person, that person's contact information or other information about the person may be presented as output.

Additionally or alternatively, the results of a query may be presented as a map, for example, of a particular area, one or more regions, one or more sates, one or more countries, or the like, with location tags shown for which one or more tags match the query. As above, other matching tags and/or tags associated with the location tags may also be presented. Further, the location tags and/or the other tags may be selectable to cause playback of the associated audio and/or video data and/or to cause other associated information to be presented as output.

Thus, in some embodiments, a user may input or otherwise cause primary data to be collected and have the primary data associated with a date and/or time, for example, by automatically date and/or time stamping the input/collected primary data or by receiving a date and/or time stamp input by the user. The input/collected primary data may then be retrieved via the associated date and/or time stamp, for example, with a user entering the date and/or time stamp as a query or request.

Similarly, in some embodiments, a user may input or otherwise cause primary data to be collected and have the primary data associated with a location, for example, by automatically identifying the location where the primary data is input/collected (e.g., by GPS) or by receiving a location input by the user. The input/collected primary data may then be retrieved via the associated location, for example, with a user entering the location or the location other wise being identified (e.g., by GPS).

In both of the foregoing cases, the input/collected data may also be associated with the user making the input or otherwise collecting the primary data. This may allow that person or a different person to retrieve the input/primary data based on the identity of that person and either the date and/or time stamp or the location, or both.

Some embodiments may take the form of a system for collecting data and associating searchable tags with the collected data. In particular, such a system may include a sensor configured to collect a primary data, such as audio and/or video data, and a processor configured to date and/or time stamp the primary data, to generate one or more searchable tags based on content of the primary data, and to associate the one or more searchable tags with the date and/or time stamped primary data. In some embodiments, the system may include one or more other sensors configured to collect secondary data other than the primary data, and the processor may be configured to generate one or more other searchable tags based on the secondary collected data; and to associate the one or more other searchable tags with the date and/or time stamped primary data.

Other embodiments may take the form of a method for collecting data and associating searchable tags with the collected data. In particular, such a method may include collecting a primary data, such as audio and/or video data, date and/or time stamping the primary data, generating one or more searchable tags based on content of the primary data, and associating the one or more searchable tags with the date and/or time-stamped primary data. In some embodiments, the method may include receiving secondary data other than the primary data, generating one or more other searchable tags based on the secondary data collected, and associating the one or more other searchable tags with the date and/or time stamped primary data.

Yet other embodiments may take the form of a method of retrieving data from a database. In particular, such a method may include receiving a search query, accessing a database including date and/or time stamped primary data and associated tags, searching the database for tags that match at least part of the received query, and retrieving data from the database based at least in part on the tags that match at least part of the received query, wherein the retrieved data includes at least one matching tag. In some embodiments, the method may further include receiving a user selection of the at least one matching tag, and, in response to the user selection, retrieving primary data associated with the at least one matching tag.

Various embodiments contemplate a computer readable storage medium including stored instructions that, when executed by a computer, cause the computer to perform any of the various methods described herein and/or any of the functions of the systems disclosed herein.

These and other embodiments and features will be apparent to those of ordinary skill in the art upon reading this disclosure in its entirety, along with the appended claims. Thus, it should be understood that embodiments may be implemented based upon monitoring collected data for an occurrence of an event in the collected data and generating a plurality of searchable tags based on the collected data. As such, the detailed description provided below should be understood as examples of how systems and methods may be implemented in terms of the occurrence of events in addition to or as an alternative to the concepts of primary data and secondary data described.

DETAILED DESCRIPTION

Figure 1:
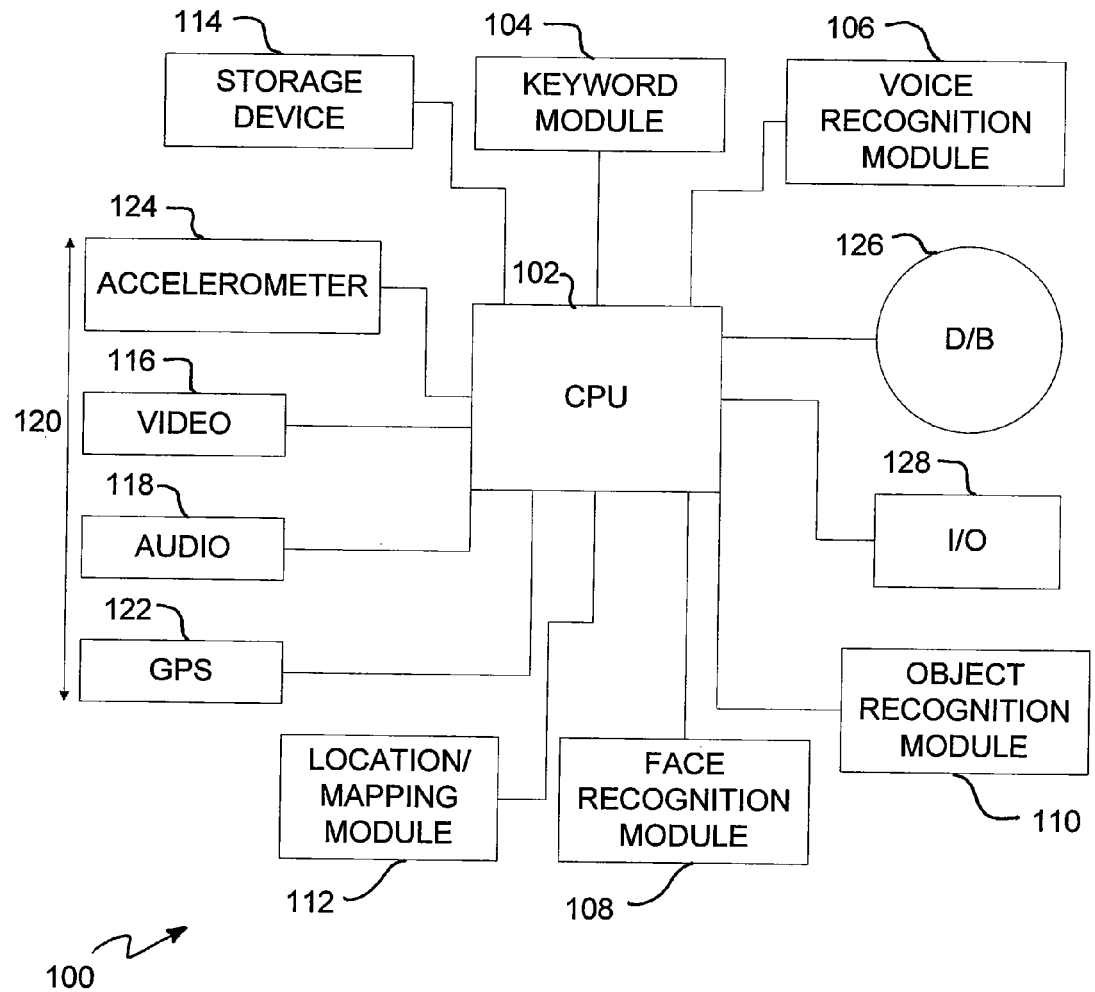
FIG. 1 is a block diagram illustrating an example of a computer system according to one embodiment.

Computer systems and methods disclosed herein may provide an new approach to collection of data, association of data and/or retrieval of data. Various embodiments contemplate using a sensor to collect a primary data, such as audio and/or video, date and/or time stamping the collected data, and associating searchable tags with the collected data based on the content of the data. Such an approach may allow the tagged data to be searched efficiently by searching the tags rather than the primary data itself. In some embodiments, the data may also be searched by the date and/or time stamps as well. Also, various embodiments contemplate monitoring data collected by a plurality of data inputs for an occurrence of an event in the collected data, and generating and associating a plurality of searchable tags based on the collected data for each occurrence of an event in the collected data.

Further, computer systems and methods disclosed herein may provide for collection of secondary data other than the primary data. Such secondary data may be date and/or time stamped for subsequent generation of tags and association of such tags with the primary data. Alternatively or additionally, such secondary data may be associated with the primary data as one or more tags as it is collected. In embodiments, the secondary data may be understood as being data collected in addition to primary data in which an event of interest has occurred. Thus, in embodiments a plurality of searchable tags may be generated based on the primary and/or secondary data collected when an event occurs, and the generated tags may be associated with each other for the event.

Various embodiments contemplate processing the primary data to generate one or more types of tags based on the content of the primary data. In some embodiments, secondary data collected may similarly be processed to generate tags. Still further, one or more types of tags may be processed to generate additional tags that may be associated with the processed tags and/or the primary data.

Examples of processing that may be performed on the primary data include, but are not limited to, audio and/or video keyword identification, voice recognition, face recognition, object recognition, and location identification. Examples of processing that may be performed on tags include, but are not limited to, determining contact information for or other information regarding a person identified by a tag, determining a map for or other information regarding a location identified by a tag, determining information regarding a keyword identified by a tag, and determining information regarding an object identified by a tag. Such contact information, maps, and other information may be entered by a user and/or may be determined from existing stored information as appropriate or desired for a given implementation.

As will be further understood from the following description, computer systems and methods disclosed herein may provide output of results of a query or search that allow a user to select one or more matching tags, date and/or time stamps, and/or primary data. Selection by the user may cause additional data and/or information to be retrieved and output. This may allow the user to evaluate search results and to obtain data/information that is of particular interest to the user and/or that best satisfy the user's intent for the query/search. This may also provide the user with efficient access to related data/information without having to perform an additional query/search.

In various embodiments of the computer systems and methods described herein, processing of the primary data may be performed while the primary data is collected. For example, such processing may be performed substantially in real time so that the primary data is stored with searchable tags and therefore is immediately or readily searchable. Additionally or alternatively, the primary data may be collected, date and/or time stamped and stored for subsequent processing and generation of tags based on the content of the primary data.

Similarly, in various embodiments, processing of secondary data collected with the primary data may be performed while the secondary data is collected. For example, such processing may be performed substantially in real time so that the secondary data is associated with the primary data as one or more tags and stored as one or more searchable tags. Additionally or alternatively, the secondary data may be collected, date and/or time stamped and stored for subsequent processing and generation of tags based on the content of the secondary data.

Still further, in various embodiments, processing of tags may be performed once the tags are generated, either immediately or subsequently, as appropriate or desired.

Turning now to particular embodiments that provide examples of how computer systems and methods may be implemented, an example of a computer system 100 is illustrated in FIG. 1. It should be understood that details of the computer system 100 not specifically discussed herein may be implemented in any suitable manner, such as conventional and well known in the art.

The computer system 100 may include a processor or central processing unit (CPU) 102. The CPU 102 may be implemented as the processor of a general purpose computer, a processor specifically designed to perform the various data processing discussed herein, and/or various circuitry configured to perform all or part of the various data processing discussed herein. As appropriate or desired, the CPU 102 may also be configured to provide control of one or more of the various elements or components of the computer system 100.

For example, the CPU 102 may include or otherwise have access to one or more modules configured to perform various aspects of the data processing. It should be understood that each of these modules may be implemented as software, hardware or any suitable combination of hardware and software as appropriate or desired for the data processing to be performed by the particular module.

As illustrated in FIG. 1, the various modules may include, but are not limited to, a keyword module 104, a voice recognition module 106, a face recognition module 108, an object recognition module 110, and a location/mapping module 112. As discussed further below, the keyword module 104 may be configured to process or analyze primary data, such as audio and/or video data, to identify one or more keywords that occur in the primary data. Any suitable techniques for recognizing spoken words, such as those employed for dictation software, language learning software, voice-activated devices, or the like, may be used. Also, any suitable techniques for recognizing written words, such as those employed for scanning, or other character recognition applications, may be used.

The voice recognition module 106 may be configured to process or analyze audio data of the primary data to identify one or more speakers that occur in the audio data. Any suitable voice recognition techniques, such as employed for dictation software, language learning software, voice-activated devices, or the like, may be used. The module 106 may also be configured to identify authors of text and/or drawings that occur in video data of the primary data. For example, this may be performed through motion determination, such as movement of an authors hand and/or a writing instrument. Alternatively or additionally, this may be performed through source identification, such as a cellular ID for text messages, a computer ID for email or instant messages, or the like.

The face recognition module 108 may be configured to process or analyze video data of the primary data to identify one or more persons that appear in the video data. Similarly, the object recognition module 110 may be configured to process or analyze video data of the primary data to identify one or more objects that appear in the video data. In each case, this the face or object recognition may be performed in a similar manner to known-techniques for such recognition. In addition to techniques employed by military and law enforcement, techniques employed in modern digital cameras may be used.

The location/mapping module 112 may be configured to process or analyze audio and/or video data of the primary data to identify one or more locations at which the primary data occurs. For example, keyword recognition as discussed above may be used to analyze audio data, where one or more identified keywords may identify the location. Additionally or alternatively, object recognition and/or character recognition may be used to analyze video data, where one or more identified objects, characters and/or words may identify the location. Also additionally or alternatively, the location/mapping module 112 may be configured to process GPS information to identify the location.

The location/mapping module 112 may be configured to determine a suitable map for the identified location(s). For example, the determined map may be a street level map, a city or town map, a state or province map, a country map, a regional map or a world map as appropriate of desired. It should be understood that the map may include one or more locations, for example, to reflect a meeting that occurs at a single location, telephone, texting, email and/or video communications that occur at multiple locations, or even directions between two locations that appear in the audio and/or video data of the primary data.

The system 100 may also include a storage device 114, such as any form of memory, disk drive, hard drive, database or the like. In addition to purposes discussed further below, the storage device 114 may include information that is accessed by the CPU 102 to support the operations of the various modules 104, 106, 108, 110 and/or 112. For example, the storage device 114 may store keywords (for audio and/or video recognition), voice samples for voice recognition, information identifying known faces for face recognition, information identifying known objects for object recognition, GPS coordinates identifying known locations, and/or map information for known locations, areas or regions. It should be understood that the information stored in the storage device 114 may include pre-existing information, user input information, and/or information developed through processing of the primary data and/or the tags. In other words, the various modules 104, 106, 108, 110 and/or 112 may be configured to "learn" in order to develop and expand the information that can be identified and/or to become more efficient and/or more accurate in the respective identifications. For example, a knowledge base may be built from various modules such as learning faces (identifying friends, relatives, coworkers, and the like), and learning places (home, work, school, and the like), as well as improving voice recognition and the like. The combination of data (e.g., who, what, when and/or where) can provide context for the system to improve the tagging of the collected data.

Various input devices may be employed to collect data for the system 100. For example, the system 100 may include a video sensor 116, such as a camera or any other suitable device configured to collect video data, and an audio sensor 118, such as a microphone or any other suitable device configured to collect audio data. Although separate video and audio sensors are illustrated for purposes of description, it should be understood that a single device may be employed to collect both types of data, such as a camera that is configured to receive both. It should also be understood that the system may include one or the other, or both as a source 120 of primary data. In other words, the primary data described herein may comprise video data, audio data, or both. Although not shown in FIG. 1 for the sake of simplicity, it should be understood that other input devices, such as a digital camera, a cellular phone, a separate computer device (e.g., personal computer, laptop computer, handheld device, or the like), or other "smart" devices, may be employed. Such devices may be configured to perform some of the analysis of the data collected, as appropriate or desired. For example, a digital camera may be configured to perform facial recognition to identify the person taking the picture or video as well as the person(s) in the picture or video.

It should also be understood that a plurality of video sensors 116 and/or a plurality of audio sensors 118 may be employed. For example, a plurality of audio sensors 118 may be used to collect audio data from multiple locations and/or directions. This may help ensure that all audio data of interest is collected. The audio data from each of the audio sensors 118 may be combined into a composite audio data stream, for example, using the audio data collected by a particular audio sensor based on clarity and/or amplitude (loudness). This may enhance the quality of the audio data that is collected, for example, by excluding collected audio data that is noisy or otherwise not of particular interest. For example, voices may be of particular interest, while background noises are much less relevant. As such, the composite audio data stream may include audio data collected by the audio sensors that is primarily voices to the exclusion of audio data collected by the audio sensors that includes relatively more background noise.

Using a plurality of video sensors 116 may provide similar benefits, such as improving the quality of the collected video data. Alternatively or additionally, using a plurality of video sensors 116 may allow collection of video data at different locations and/or from different points of view. For example, video sensors 116 at different locations may allow video data of different persons involved in a telephone or video conference to be collected. Also, video sensors 116 with different points of view may allow for a more complete collection of video data such as of multiple people involved in a discussion and variously positioned in a conference room. Similar to audio data discussed above, the video data from each of the video sensors 116 may be combined into a composite audio data stream, for example, using the audio data collected by a particular video sensor based on relative importance of the video data collected. This may enhance the quality of the video data that is collected, for example, by excluding collected video data that is out of focus, obscured or otherwise not of particular interest. For example, people may be of particular interest, particularly those speaking and/or acting (e.g., writing and/or drawing), while video of the surroundings may be less relevant. As such, the composite video data stream may include video data collected by the video sensors that is of people to the exclusion of video data collected by the video sensors that includes relatively less people, speakers and/or actors. However, unlike audio data, the video data collected may generate multiple video data streams, each of which may be processed as primary data to include its own associated searchable tags. As such, the system 100 may be configured to generate multiple video data streams for a given time period, each being searchable as described herein.

Additionally, the system 100 may include one or more sensors configured to collect other types of data. For example, the system 100 may include a GPS sensor 122, such as an antenna configured to communicate with a one or more GPS satellites, to collect location data. As appropriate or desired, the location information may include tracking movement between locations. Further, a plurality of GPS sensors 122 may be employed, for example, to identify separate locations of different people, such as people located in different cities involved in a telephone or video conference.

As illustrated, the system may also include an accelerometer 124 to collect movement data. The accelerometer 124 may be associated with a person, for example, to collect data regarding the person's movements. Such movement data may be collected based on the accelerometer 124 being associated with a person, a specific part of a person (e.g., a person's hand used for writing), and/or an object, such as a writing instrument. As such, the accelerometer(s) may be configured to track movements that may identify certain actions by the person (such as falling down), that may identify gestures of the person, and/or may identify writing and/or drawing by the person. Thus, it should be understood that a plurality of accelerometers 124 may be used to track movements of a given person. It should also be understood that a plurality of accelerometers 124 may be used to track movements of a plurality of people and/or objects.

The sensors 116, 118, 122 and/or 124 may each be configured to date and/or time stamp the collected data. The CPU 102 may be configured to synchronize the date and/or time for each of the sensors 116, 118, 122 and/or 124 to provide a proper correspondence between the different data collected thereby. Alternatively or additionally, the CPU 102 may be configured to date and/or time stamp the data collected by one or more of the sensors 116, 118, 122 and/or 124. In particular, it may be beneficial to provide date and/or time stamping via the CPU 102 to ensure a proper correspondence between the different data collected by the sensors 116, 118, 122 and/or 124.

In some embodiments, the CPU 102 in conjunction with one or more of the modules 104, 106, 108, 110, 112 may process the data collected by the sensors 116, 118, 122, 124 to generate various searchable tags corresponding to identified information, such as keywords, voices, people, objects, locations, and the like. The CPU 102 may associate the generated tags with the primary data based on the date and/or time stamp of the identified information so that the tags are linked to the corresponding date and/or time stamp in the primary data.

As discussed above, the primary data may consist of audio data, video data, or both, and may include multiple video data streams, as appropriate or desired. Thus, the generated tags may be associated with the collected audio and/or video data as appropriate or desired for a given implementation.

In one implementation, the tags may be associated with or linked to the primary data by one or more bits that identify the corresponding date and/or time stamp. Additionally, such bits may allow the tags to be searched based on date and/or time stamps as well. Additionally, the tags may include one or more bits that identify a type or category of the individual tags. Further, the tags may include one or more bits that identify the content of the individual tags and/or the content of the associated primary data. Such bits may allow the tags to be searched by type and/or content, as appropriate or desired.

The system 100 may further include a database 126 for storage of the tagged primary data. The data stored in the database 126 may be searchable by the associated tags, and may also be searchable based on date and/or time stamps. This may provide enhanced searching in terms of speed, efficiency and/or relevance of results, particularly with regard to large amounts of data that may be stored in the database 126. Further, this may provide enhanced retrieval of data by providing tags and/or time stamps as results that may be selected by a user to retrieve data associated with the selected tags and/or time stamps. Thus, a user may input a query via an input/output interface 128 to cause the CPU 102 to perform a desired search of the data stored in the database 126, and obtain search results via the input/output interface 128. The search results may be presented to the user as one or more tags and/or time stamps that may be selected to cause the CPU 102 to retrieve desired data from the database 126, without a need to revise the query and to have another search performed. Thus, it should be understood that embodiments may provide a distinct advantage in the ability to quickly search tags. In particular, embodiments may be configured to process collected data as the data is collected and/or as the data occurs to generate an efficient database that may be queried for tags. Although the collected data could be recorded and later processed for tagging, doing so may be time consuming and inefficient as compared to detecting "events" in the collected data (such as occurrence of a voice, a person, a change in location, and the like) to trigger tagging of the collected data.

It should be understood that the input/output interface 128 may be any suitable device or combination of devices that is/are configured to receive user input and to provide a suitable form of output. Thus, any known device(s), such as a keyboard, a display or monitor, a touch screen, a mouse, a trackball, a stylus, a microphone, a speaker, or the like, or any device(s) hereafter developed may be employed.

It should also be understood that various configurations of a computer system or computer systems may be envisioned to meet the demands of a particular implementation. For example, it may be desirable to have a portable computer system configured to collect data as described above. In particular, such a portable computer system may be configured to be worn or otherwise carried on a person to allow the person to collect data regarding virtually any experience the person has with others and/or his environment. In such embodiments, the portability (e.g., size, weight) and/or unobtrusiveness of the computer system may be particularly important. As such, the number of elements or components and/or the capabilities thereof may be limited to achieve such attributes.

Figure 2:
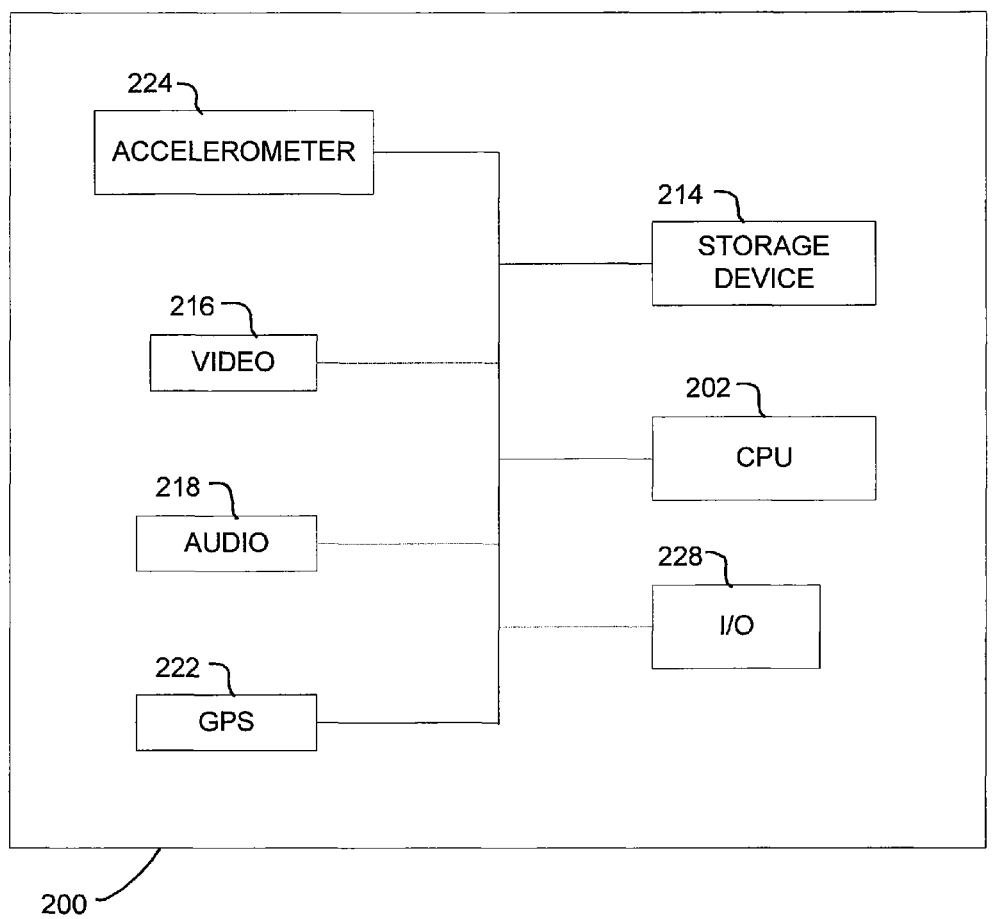
FIG. 2 is a block diagram illustrating an example of a computing device according to one embodiment.
Figure 3:
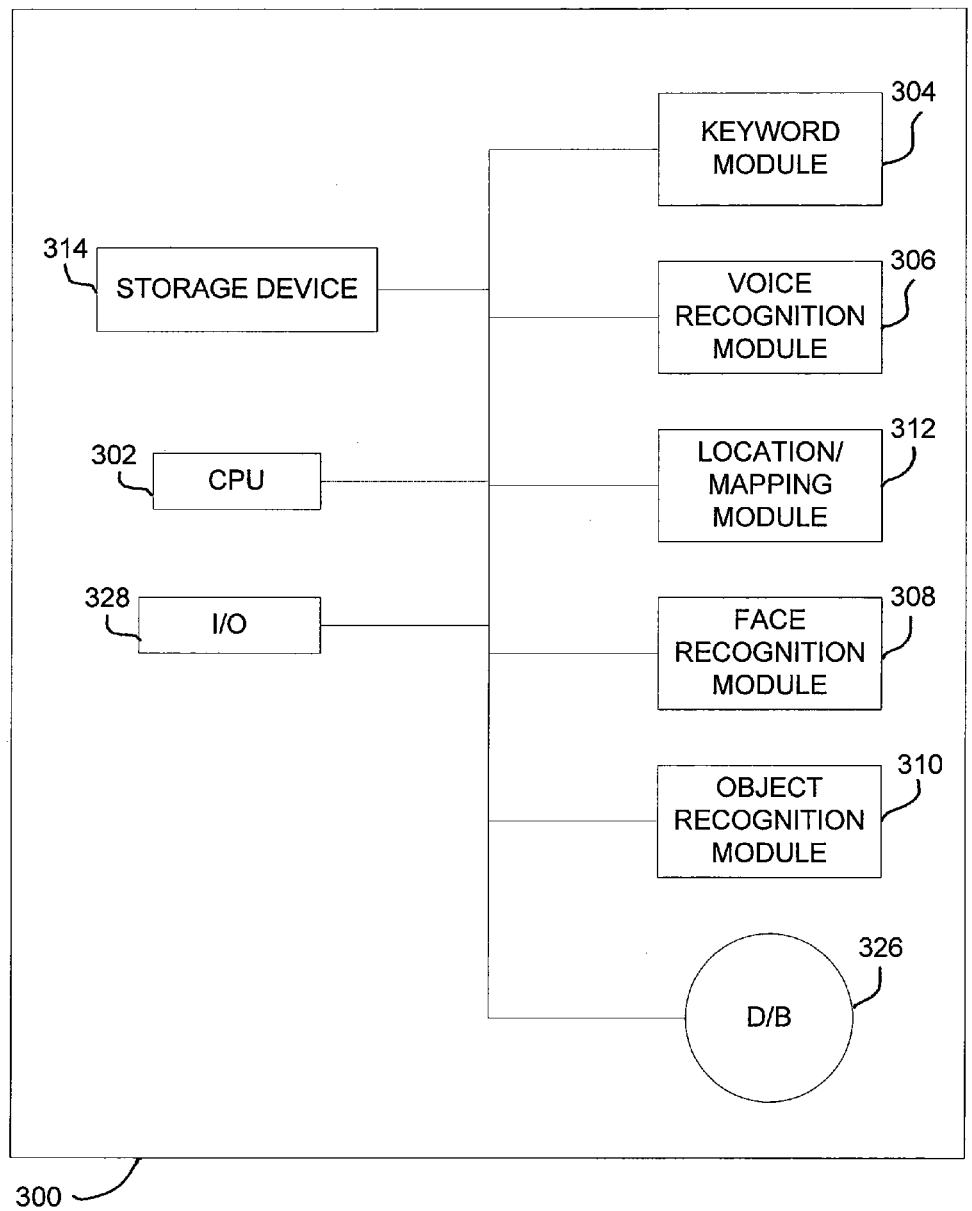
FIG. 3 is a block diagram illustrating an example of a computing system that may be employed with the computing device of FIG. 2.

Examples of a computing device 200 and a computer system 300 that may be employed with the computing device 200 are depicted in the block diagrams of FIGS. 2 and 3, respectively. It should be understood that the storage capacity and/or the processing capability of the computing device 200 may be relatively limited as compared to that of the computer system 300, for example, to achieve a desired portability of the computing device 200 and a desired capability of the computer system 300. Thus, the various elements/components described above with respect to the computer system 100 may be appropriately divided between the computing device 200 and the computer system 300.

In particular, the computing device 200 may be configured to provide data collection via a plurality of sensors such as described above. Thus, the computing device 200 may include a video sensor 216, an audio sensor 218, a GPS sensor 222 and/or an accelerometer 224. The computing device 200 may include a suitable processor or CPU 202 for controlling operations of the sensors 216, 218, 222, 224, as appropriate or desired. The CPU 202 may also be configured to perform a certain amount of processing of the data collected by the sensors 216, 218, 222, 224. For example, the CPU 202 may be configured to date and/or time stamp the data collected by the sensors 216, 218, 222, 224, to generate tags based on data collected by the sensors 222, 224, and/or to associate the generated tags with primary data collected by the sensors 216, 218.

The computing device 200 may further include a storage device 214 for storing the data collected by the sensors 216, 218, 222, 224 as well as the tags generated by the CPU 202. The computing device 200 may also include an input/output interface 228, which may be configured to receive user input of tags to be associated with primary data collected by the sensors 216, 218. The input/output interface 228 may also be configured to output the data stored by the storage device 214, for example, to the computer system 300, where further data processing, tag generation and tag association may be provided.

Thus, the computer system 300 may include an input/output interface 328 that is configured to receive data from the computing device 200. The received data may be stored, for example, in a suitable storage device 314 of the computer system 300. As discussed above with respect to the example of FIG. 1, the information stored in the storage device 314 may include pre-existing information, user input information, and/or information developed through processing of the primary data and/or the tags.

The computer system 300 may also include a suitable processor or CPU 302, as well as various data processing modules, such as a keyword module 304, a voice recognition module 306, a face recognition module 308, an object recognition module 310, and a location/mapping module 312 as shown. The CPU 302 may be configured to control or otherwise cooperate with the modules 304, 306, 308, 310, 312 to process/analyze the primary data received from the computing device 200, to generate corresponding tags, and to associate the tags with the primary data, such as described above with respect to the example of FIG. 1.

The computer system 300 may further include a database 326 where the CPU 302 may store the primary data and the associated tags. The input/output interface 328 may also be configured to receive user input of a query, which may be processed by the CPU 302 and cause the CPU 302 to perform a search of the primary data stored in the database 326 by tags and/or time stamps, such as described above with respect to the example of FIG. 1.

Figure 4:
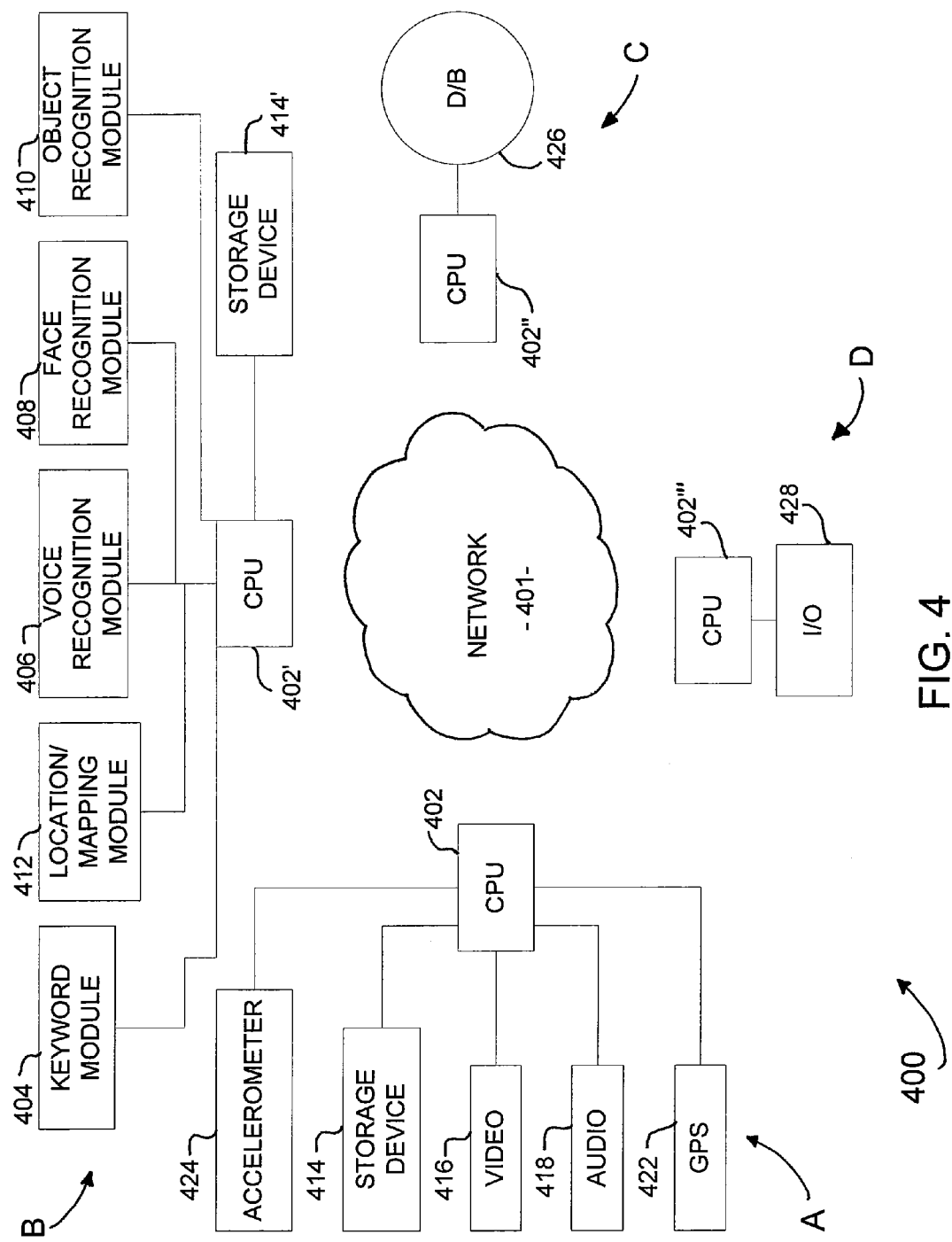
FIG. 4 is a block diagram illustrating an example of a networked computer system according to one embodiment.

In addition to a division of operations and functionality between a computing device and a computer system as described above, a distributed computer system including various subsystems may be envisioned. For example, a networked computer system 400 as illustrated in FIG. 4 may be implemented.

The networked computer system 400 may include various subsystems generally denoted as A, B, C and D. Each of the subsystems A, B, C and D may be connected to a network 401, such as a local area network (LAN), an intranet, the Internet, or the like. As such, the subsystems A, B, C and D may be configured to send and/or receive data communications from the other subsystems via the network 401. Although not shown, it should be understood that the subsystems A, B, C and D may include suitable interfaces for enabling their data communications via the network 401.

Subsystem A may include a suitable processor or CPU 402, a storage device 414, and various sensors, such as a video sensor 416, an audio sensor 418, a GPS sensor and an accelerometer 420. These elements or components may provide the same operations and functionality as the corresponding elements/components discussed above.

Subsystem B may include a suitable processor or CPU 402', a storage device 414', and various data processing modules, such as a keyword module 404, a voice recognition module 406, a face recognition module 408, an object recognition module 410 and a location/mapping module 412. These elements or components may provide the same operations and functionality as the corresponding elements/components discussed above.

Subsystem C may include a suitable processor or CPU 402" and a database 426, and subsystem D may include a suitable processor or CPU 402'" and a suitable input/output interface 428. The input/output interface 428 may be configured to receive user input of information to be stored in the storage device 414 of subsystem A, and to receive user input of a query for searching primary data stored in the database 426 of subsystem C. Either the CPU 402" of subsystem C or the CPU 402'" of subsystem D may be configured to process or analyze the query and/or to perform a search of tags and/or time stamps stored in the database 426 based on the query. Results of the search may be provided to the user via the input/output interface 428 in any suitable form.

Although the various operations and functionality of the computer system 400 may be distributed between the subsystems A, B, C and D, it should be understood that the subsystems may be configured other than as illustrated in FIG. 4. For example, a single storage device may serve both subsystems A and B. Further, the database 426 may be configured to provide the functionality of the storage device 414 and/or the storage device 414', for example, by being partitioned or otherwise configured to provide storage of the primary data and associated tags, as determined by subsystems A and B, separately from the secondary data and information stored by the computer system 400.

While the foregoing examples of computer systems are described as including particular elements or components, it should also be understood that such features may be included or omitted based on a desired implementation. It should also be understood that other elements or components, such as sensors and/or modules other than those depicted, may be included in addition to or in place of those depicted without departing from the concepts, methodology and/or functionality described herein.

Further, it should be understood that the connections between elements or components depicted in the foregoing examples of computer systems may be implemented as any suitable wired or wireless connections that provide data communications therebetween. Thus, each of the connections depicted may generally be considered to be a communication link without restriction to a particular type that may be employed for a given implementation.

Various methods, processes and operations will be evident to those skilled in the art from the foregoing descriptions of devices/systems without further explanation. Still, examples of various methods may be understood from the various data flows discussed below with respect to FIGS. 5-10, without any intention of limiting the methods that may be envisioned based on the disclosure provided herein.

Figure 5:
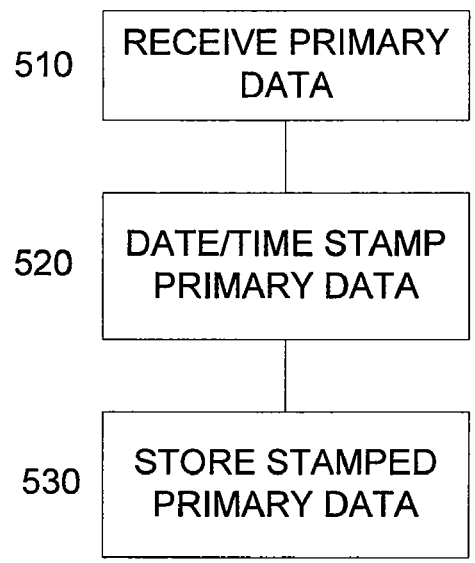
FIG. 5 is a block diagram illustrating an example of data flow for collecting primary data.

FIG. 5 illustrates an example of data flow for collecting primary data. In block 510, primary data may be received. As discussed above, the primary data may be received using one or more sensors configured to detect, capture or otherwise collect the type of data determined to be primary data. In particular, the primary data may be audio data, video data, or both.

Once the primary data is received, the primary data may be date and/or time stamped in block 520. Date and/or time stamping may be performed by a processor or other control, such as the control(s) of the primary data sensor(s). Date and/or time stamping may be performed in any suitable manner that allows the primary data to be tagged or otherwise coded with the time and/or date at which the primary data is received. For example, the date and/or time stamps, as well as the other tags, may be generated as a form of meta data associated with the primary data and/or the secondary data. In some embodiments, the audio and/or video data collected may be date and/or time stamped as well as tagged for other data upon the occurrence of an "event." An "event" may be any occurrence in the audio and/or video data collected that is considered important. For example, when a face of a person is recognized, an "event" may be created and date and/or time stamps and other tags (e.g., GPS location, temperature, humidity, key words, voices, and the like) may be associated with the particular "event." It should be understood that other occurrences in the collected data may create "events" as well, as appropriate or desired. For example, embodiments may employ a list of "events" that are to be identified in the audio and/or video data collected, and upon each occurrence of one of the "events" as many tags as can be identified in the collected data may be generated and associated with the corresponding "event." As such, it should be understood that "events" may overlap.

Next, in block 530, the date and/or time stamped primary data may be stored for subsequent transfer and/or data processing.

Figure 6:
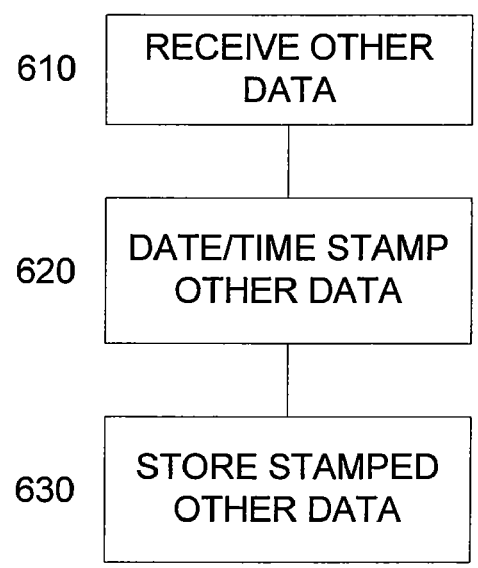
FIG. 6 is a block diagram illustrating an example of data flow for collecting data other than primary data.

FIG. 6 illustrates an example of data flow for collecting secondary data other than the primary data. Similar to the data flow for collecting the primary data, in block 610 the secondary data may be received using one or more sensors configured to detect, capture or otherwise collect the type of secondary data to be collected. As discussed above, examples of secondary data to be collected include GPS data and movement/motion data, such examples not being exhaustive of secondary data that may be desirable to receive. It should be understood that any other secondary data, such as temperature, humidity or any other data that a person might perceive and associate with an event, may be used to tag the primary data and provide a searchable basis for identifying an event in the primary data.

Once the secondary data is received, the secondary data may be date and/or time stamped in block 620, such as described above for date and/or time stamping of the primary data. Next, in block 630, the date and/or time stamped secondary data may be stored for subsequent transfer and/or data processing.

Figure 7:
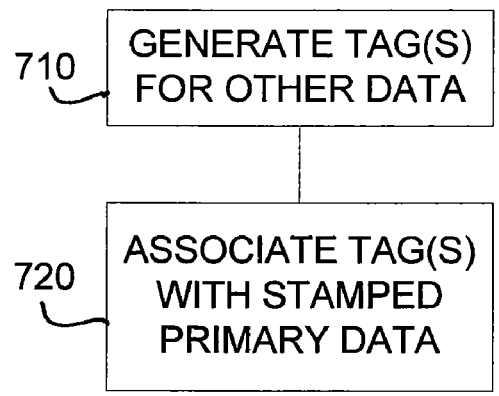
FIG. 7 is a block diagram illustrating another example of data flow for collecting data other than primary data.

FIG. 7 illustrates another example of data flow for collecting secondary data other than primary data, which may be employed as an alternative to block 630 in the data flow illustrated in FIG. 6. After the received secondary data is date and/or time stamped (block 620 in FIG. 6), in block 710 one or more tags corresponding to the secondary data may be generated. Then, in block 720 the generated tag(s) may be associated with the stamped primary data (block 520 in FIG. 6). Because tag(s) are generated and associated with the stamped primary data, there may be no need to store the date and/or time stamped data (block 630 in FIG. 6). Instead, the tag(s) may be stored, for example, with the date and/or time stamped primary data (block 530 in FIG. 5).

Figure 8:
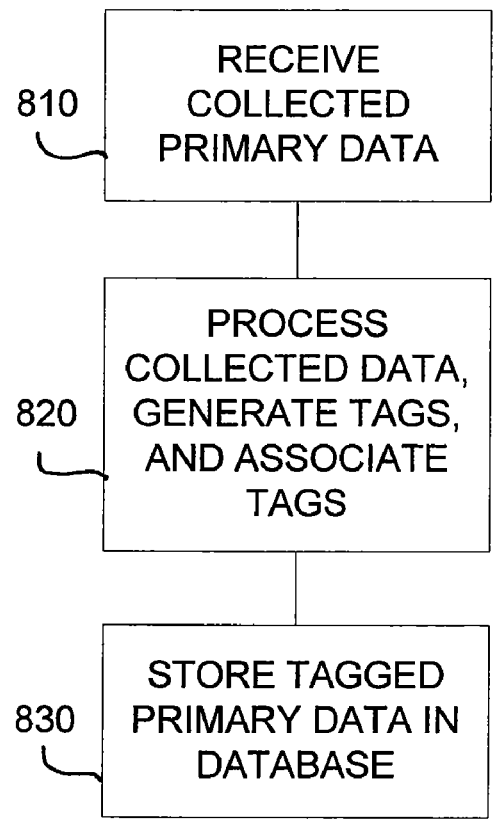
FIG. 8 is a block diagram illustrating an example of data flow for processing and tagging collected data.

FIG. 8 illustrates an example of data flow for processing and tagging collected data, namely the primary data. In block 810, the collected primary data (date and/or time stamped in block 520 in FIG. 5) may be received. This data may be received as a transfer of the data stored in block 530 in FIG. 5. Alternatively, this data may be received by the storing performed in block 530. Next, in block 820 the collected primary data may be processed or analyzed to identify data to be tagged, one or more tags may be generated, and the generated tag(s) may be associated with the collected primary data. Then, in block 830 the tagged primary data, or the primary data and the associated tag(s), may be stored in a database.

Figure 9:
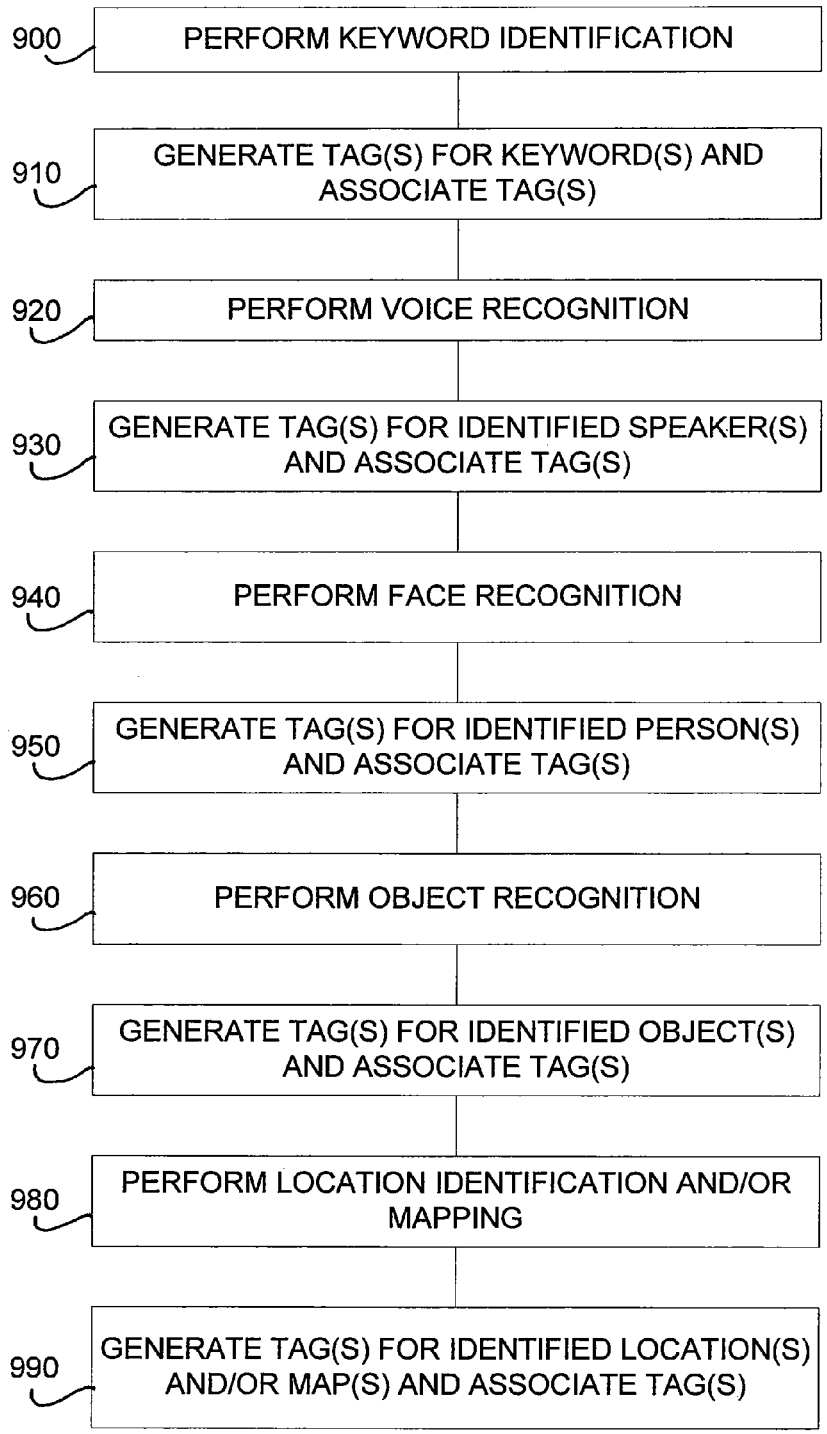
FIG. 9 is a block diagram illustrating a more detailed example of data flow for processing and tagging collected data.

FIG. 9 illustrates a more detailed example of data flow for processing and tagging collected primary data. It should be understood that such details will depend on the types of data in the primary data that are intended to be tagged for a given implementation. Thus, FIG. 9 provides an example corresponding to the examples of systems described above for the sake of understanding. It should also be understood that certain operations set forth in FIG. 9 may be performed concurrently rather than in any particular order. As such, the particular order illustrated should not be understood to be limiting, but should only be considered necessary for operations that are performed on the results of another operation.

In block 900 occurrences of keywords in the primary data may be identified. As described above, keywords may occur in audio data (e.g., spoken) and in video data (e.g., written). Then, in block 910 a tag for each of the identified occurrences of a keyword may be generated and associated with the primary data. As described herein, association of a tag with the primary data involves associating the tag with the primary data based on the date and/or time stamp at which the corresponding type of data occurred.

In block 920 occurrences of voices in the primary data (audio) may be identified as belonging to a corresponding person/speaker. Then, in block 930 a tag for each of the identified occurrences of a speaker's voice may be generated and associated with the primary data.

In block 940 occurrences of faces in the primary data (video) may be identified as belonging to a corresponding person. Then, in block 950 a tag for each of the identified occurrences of a person's face may be generated and associated with the primary data.

In block 960 occurrences of objects in the primary data (video) may be identified as being a particular known object. Then, in block 970 a tag for each of the identified occurrences of a known object may be generated and associated with the primary data.

In block 980 occurrences of data in the primary data (audio or video) that identifies a location may be recognized. Then, in block 990 a tag for each of the occurrences of data that identifies a location may be generated and associated with the primary data. Alternatively or additionally, a tag for a map of a location identified by occurrences of data in the primary data may be generated and associated with the primary data. When data occurring in the primary data identifies more than one location, a tag for a map encompassing the identified locations with the identified locations particularly noted may be generated and associated with the primary data.

Figure 10:
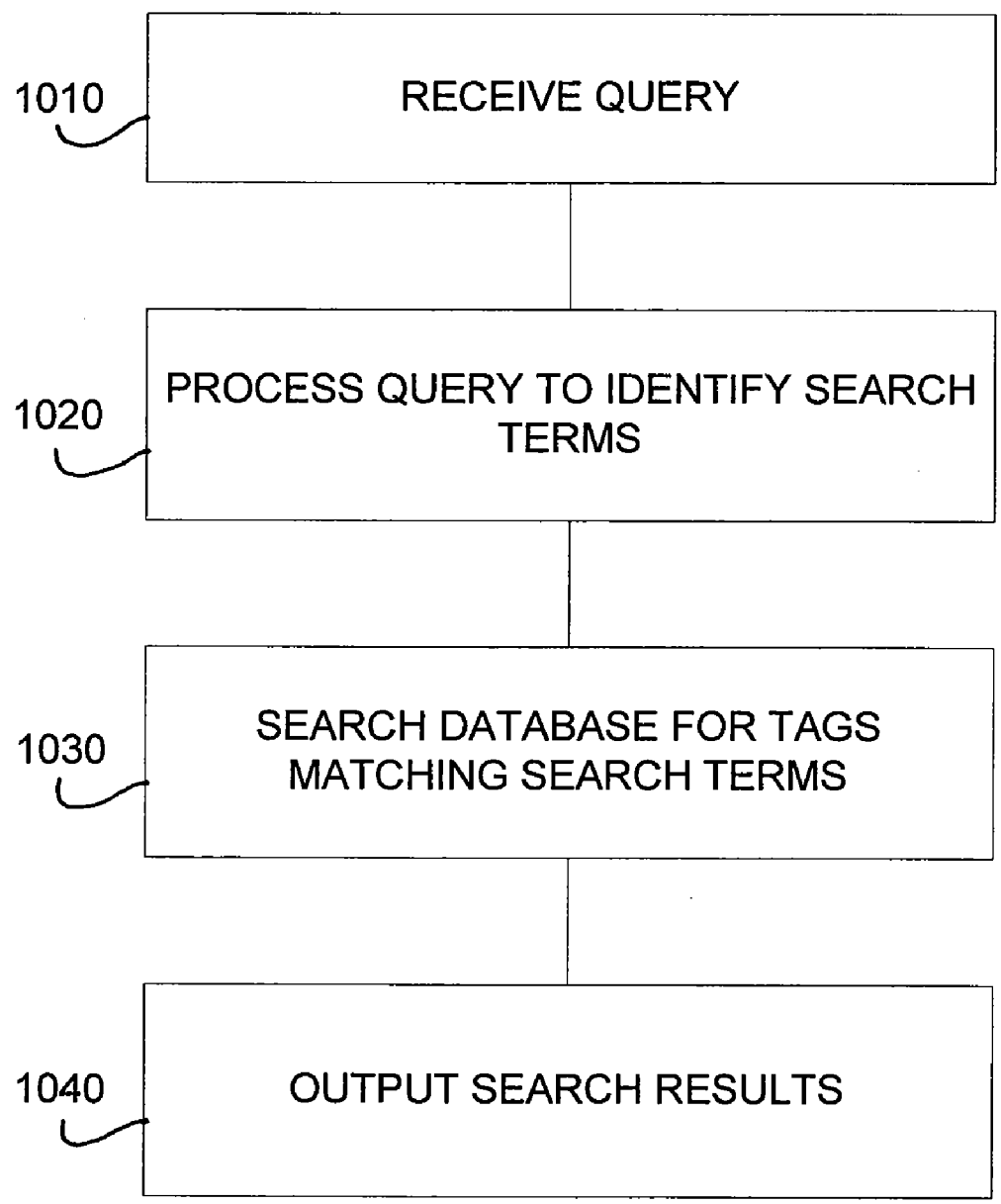
FIG. 10 is a block diagram illustrating an example of data flow for retrieving data from a database of tagged data.

FIG. 10 illustrates an example of data flow for retrieving data from a database of tagged data. In block 1010 a query may be received, for example, from a user. The query may be provided in any suitable manner. For example, the query may be provided by typing on a keyboard, by speaking into a microphone, or by interacting with any other suitable input device configured to receive user input and supply the user input to a processor or CPU.

In block 1020 the query may be processed to identify one or more search terms. For example, keywords, names of persons, names of places or locations, names of objects, dates, and/or times may be determined based on an analysis of the query. Thus, the processing/analyzing of a query may allow natural sentences and/or sentence fragments to be used as a query. Alternatively, a specified format for queries may be required, such as for boolean searching.

Next, in block 1030 the database may be searched for tags that match the identified search terms. This operation may include searching the database for date and/or time stamps when dates and/or times are identified from the query. As such, it should be understood that the date and/or time stamps of the primary data may be configured as tags such that only tags are searched for any query as opposed to searching tags and date and/or time stamps as different types of data associated with the primary data. Once the search of the database is complete, in block 1040 results of the search may be output.

The search results may be provided in any suitable form. For example, the search results may be one or more portions of the primary data. In particular, a portion of the primary data may be identified as a search result by one or more of the search terms matching one or more tags and/or date and/or time stamps associated with the portion of the primary data. Such results may be provided to the user as a replay (audio and/or video) of the portion(s) of the primary data. Alternatively, such results may be provided to the user as selectable results, allowing the user to select one or more portions included in the results for replay.

Still further, the results may be provided to the user as matching tags and/or matching date and/or time stamps, either with or without the associated primary data. The matching tags may be user-selectable to provide a replay of the associated primary data and/or to provide additional information related to or associated with the selected tag. Similarly, the matching date and/or time stamps may be user-selectable to provide a replay of the associated primary data and/or to provide additional information related to or associated with the selected date and/or time stamp. Such additional information may include, but is not limited to, one or more tags associated with the primary data for the selected date and/or time stamp.

Figure 11:
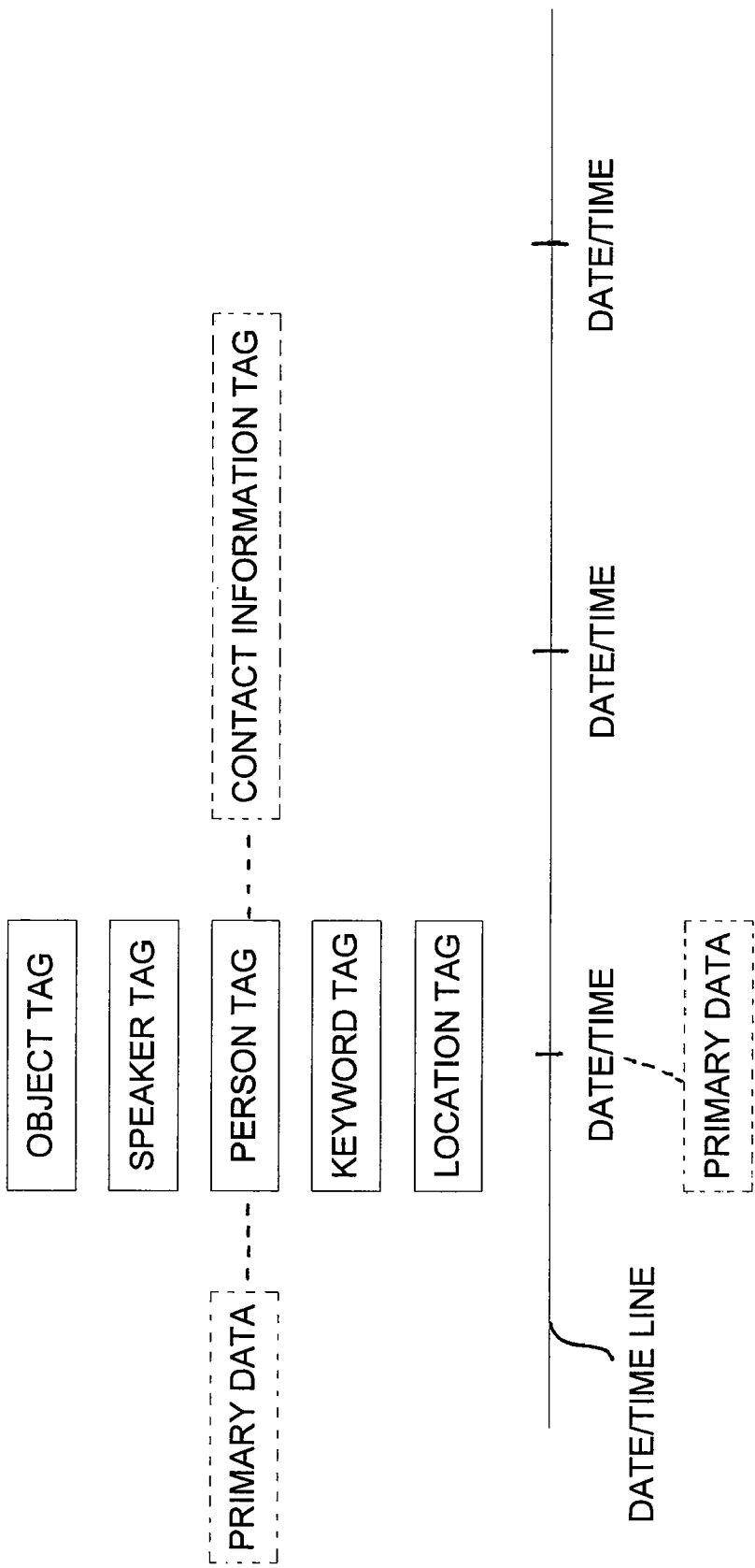
FIG. 11 is an illustration of an example of output of results from searching a database of tagged data.

FIG. 11 illustrates of an example of output of results from searching a database of tagged data. As shown, the results may be presented with a date and/or time line including one or more date and/or time stamps along the date and/or time line. The date and/or time stamps may be included based on the date and/or time stamps matching one or more of the search terms or being included within a period determined from the query. Alternatively or additionally, date and/or time stamps may be included based on one or more tags, associated with the primary data at the particular date and/or time stamp, matching one or more of the search terms. Similarly, tags matching one or more of the search terms and/or being associated with the primary data at a date and/or time stamp that matches one or more of the search terms or is included within a period determined from the query may be included. As illustrated in dashed lines, selection of a date and/or time stamp included in the results may cause the associated primary data to be replayed. Similarly, selection of a tag (e.g., person) included in the results may cause the associated primary data to be replayed and/or other related/associated information (e.g., contact information of the person) to be provided.

Figure 12:
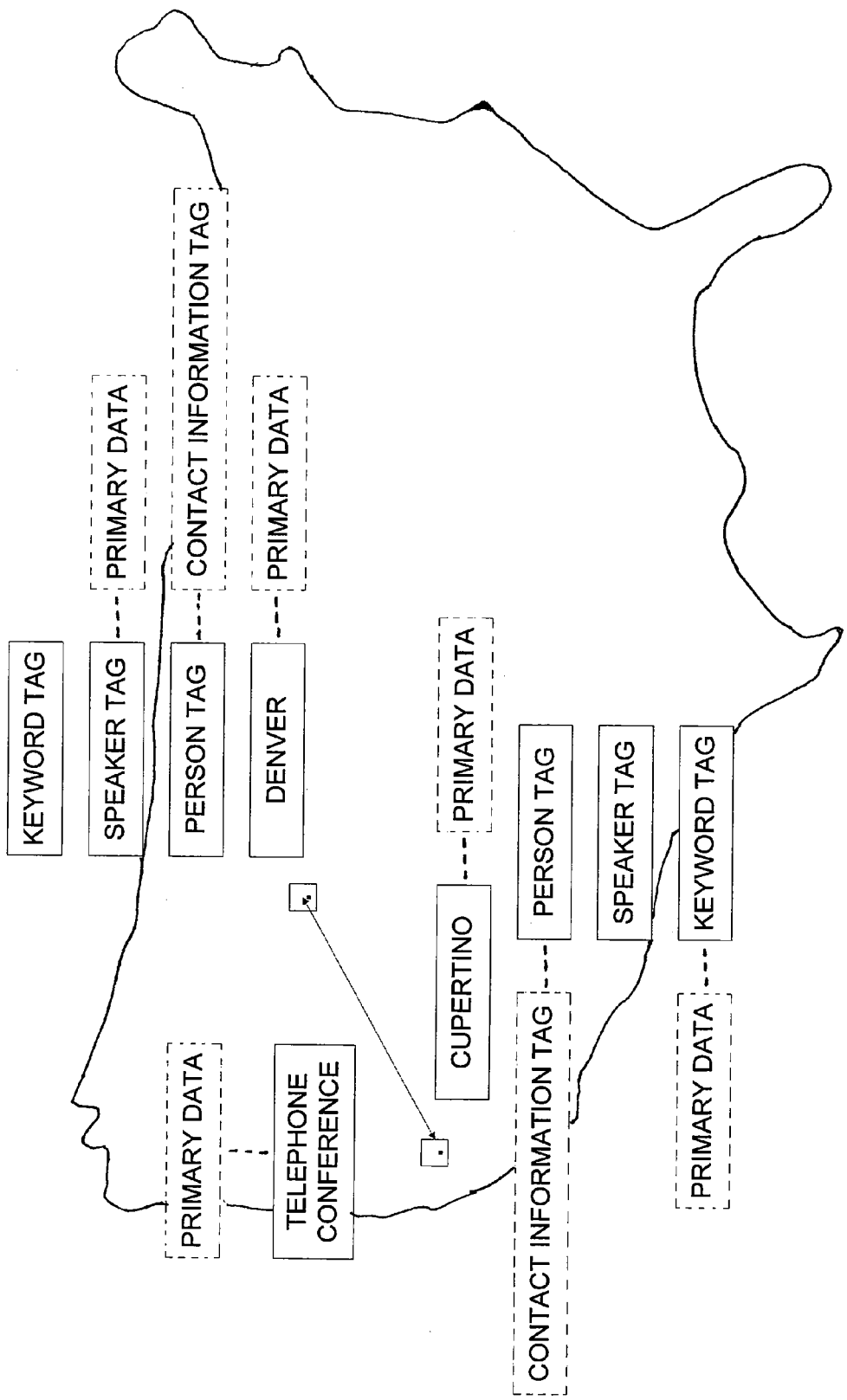
FIG. 12 is an illustration of another example of output of results from searching a database of tagged data.

FIG. 12 illustrates another example of output of results from searching a database of tagged data. As shown, the results may be presented with a map (e.g., the United States) including one or more locations for which associated tags match search terms. The map may be determined by the location(s) included in the results. Tags matching one or more of the search terms and/or associated with the location(s) may also be included in the results. Similar to the description above, selection of a location (e.g., Cupertino or Denver) included in the results may cause the associated primary data to be replayed (again, illustrated in dashed lines). Similarly, selection of a tag (e.g., keyword or person) included in the results may cause the associated primary data to be replayed and/or other related/associated information (contact information of the person) to be provided.

It should be understood that the foregoing examples of output illustrated in FIGS. 11 and 12 are not exhaustive, and that other forms or formats of output may be envisioned to provide a useful and/or usable output to the user. For example, a listing of one or more groups of tags and/or date and/or time stamps may be provided. Similar to the description above, the tags/stamps may be user-selectable to provide a replay of the primary data associated therewith and/or to provide additional related/associated information, as appropriate or desired.

Although various data processing techniques, data association techniques and data searching techniques are known and may be employed by the computer systems described herein, it should be recognized that the computer systems and methods described herein provide functionality and results not recognized by existing systems and methods for collecting, processing and/or retrieving data.

As such, it should be understood that various aspects described above may enable unique implementations for data storage and retrieval not contemplated or possible with known computer systems. For example, notes to friends and/or or the general public may be input (e.g., typed, written or spoken) or otherwise collected (e.g., recorded) and date and/or time stamped and/or location tagged. Others may then search for the particular date, time, person (e.g., author or speaker) and/or location to retrieve the note.

In particular, mobile devices such as a smartphone or a tablet device may be employed to retrieve such information. As noted above, the current location of the mobile device may be known, for example, based on a GPS feature of the device. As such, a user of the device may access historical information for the particular location, comments, pictures and/or video regarding their or another person's prior visit to the particular location, or other information related to the particular location. Similarly, reviews and/or comments regarding restaurants, tourist attractions, and the like input/collected by the person or others may be accessed readily based on the known location of the device.

The foregoing merely illustrates certain principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles disclosed in this document and are thus within the spirit and scope of the present invention. From the above description and drawings, it will be understood by those of ordinary skill in the art that the particular embodiments shown and described are for purposes of illustration only and are not intended to limit the scope of the present invention. Further, it will be understood that various features of the particular embodiments may be employed in the other embodiments, as appropriate or desired. References to details of particular embodiments are not intended to limit the scope of the invention.

The invention claimed is:

1. A system for collecting data and associating searchable tags with the collected data, the system comprising:
    at least one sensor configured to collect first primary data; and
    a processor configured to date and/or time stamp the primary data, to generate at least one searchable tag based on content of the primary data, to associate the at least one searchable tag with the date and/or time-stamped primary data;
    a storage medium configured to store the primary data, and a plurality of additional primary data in a database; wherein
    the processor is further configured to retrieve the primary data and to associate at least one of the plurality of additional primary data having the same searchable tag as the first primary data in response to a query, the processor further configured to output the first primary data and the at least one of the plurality of additional primary data with the same searchable tag in a time line such that both the first primary data and the at least one of the plurality of additional primary data are accessible from the time line.

2. The system of claim 1, wherein the primary data is at least one of audio data and video data.

3. The system of claim 1, wherein the at least one searchable tag comprises a plurality of searchable tags, the system further comprising a database storing the collected primary data and the plurality of searchable tags associated with the primary data.

4. The system of claim 1, further comprising an input device configured to input the query based upon which the tags are searched.

5. The system of claim 1, further comprising at least one other sensor configured to collect secondary data other than the primary data, wherein the processor is further configured to generate at least one other searchable tag based on the secondary data collected by the other sensor and to associate the at least one other searchable tag with the date and/or time stamped primary data.

6. A method for collecting data and associating searchable tags with the collected data, the method comprising:
    collecting primary data from a sensor;
    time stamping the primary data by a computing device;
    generating, by a processor, at least one searchable tag based on content of the primary data;
    associating, by a processor, the at least one searchable tag with the time-stamped primary data;

storing the at least one searchable tag, the time-stamped primary data in a database and a plurality of secondary data;

associating at least one of the plurality of secondary data with the primary data having the same searchable tag in response to a query; and outputting the primary data and the associated at least one of the plurality of secondary data with the same searchable tag in a time line, both the primary data and associated at least one of plurality of secondary data area accessible from the time line.

7. The method of claim 6, wherein the primary data collected is at least one of audio data and video data.

8. The method of claim 6, further comprising:
collecting the plurality of secondary data other than the primary data;
generating at least one other searchable tag based on the plurality of secondary data collected; and
associating the at least one other searchable tag with the date and/or time stamped primary data.

9. A method of retrieving data from a database, the method comprising:
receiving a search query at a computing device, the search query originating from an input device associated with the computing device;
accessing, by a processor of the computing device, a database including date and/or time stamped primary data and associated tags, the database stored on an electronic storage medium accessible by the processor;
searching the database for tags that match at least part of the received query;
associating additional data with the time stamped primary data for a particular person;
retrieving, by the processor, data from the database based at least in part on the tags that match at least part of the received query; and
presenting the primary data and the additional data for the particular person in a time line, thereby displaying a plurality of data related to the particular person in a temporal fashion in response to the received query.

10. The method of claim 9, further comprising:
receiving a user selection of the at least one matching tag;
in response to the user selection, retrieving primary data associated with the at least one matching tag.

11. A system for collecting data and associating searchable tags with the collected data, the system comprising:
at least one sensor configured to collect data; and
a processor configured to monitor data collected by the at least one sensor, to identify an occurrence of an event in the collected data, to generate a plurality of searchable tags based on the data collected for the occurrence of the event, to associate the generated searchable tags for the occurrence of the event with each other, and to store the collected data and the generated searchable tags in a searchable database; wherein
the processor is further configured to retrieve the collected data and to associate at least one additional data with the collected data having the same generated searchable tag in response to a query, the processor further configured to output a time line displaying a temporal relationship between the data and the at least one associated additional data such that both the collected data and the at least one associated additional data area accessible from the time line.

12. The system of claim 11, wherein the processor is further configured to receive a query, to search the tags stored in the searchable database based on the received query, and to retrieve associated tags from the searchable database when at least one of the associated tags matches a part of the query.

* * * * *